Jan. 28, 1964 H. MEYER 3,119,187
DISTANCE MEASURING DEVICES
Filed Aug. 20, 1962
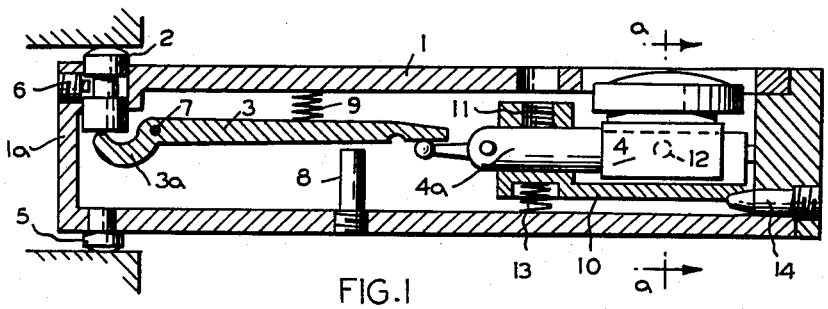
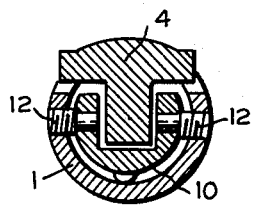
FIG.3
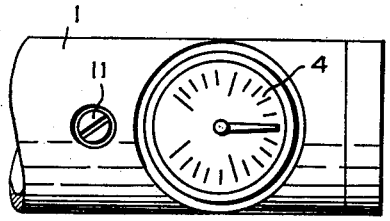
FIG.2
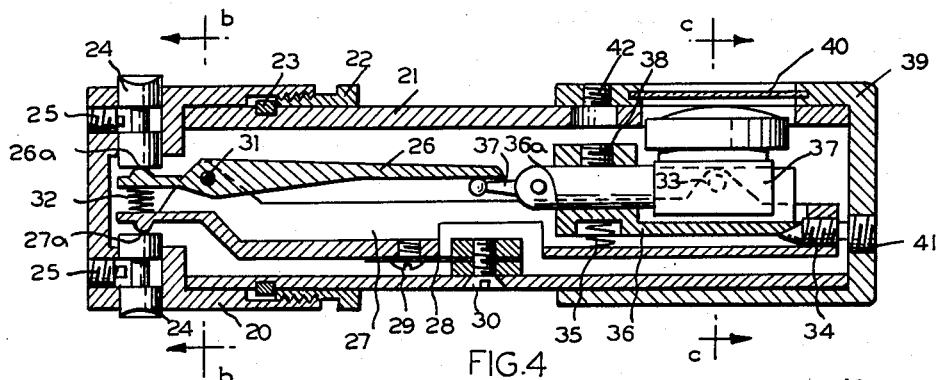
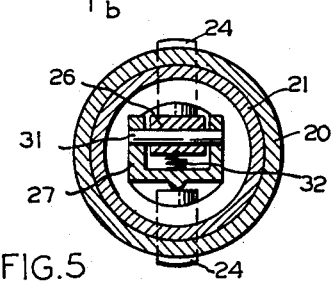
FIG.5
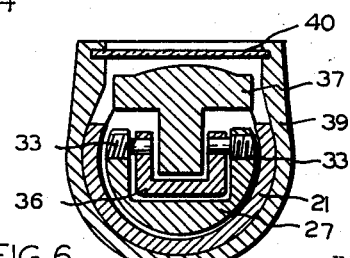
FIG.6
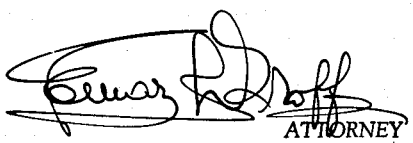
INVENTOR
HANS MEYER
BY
ATTORNEY United States Patent Office 3,119,187
Patented Jan. 28, 1964

3,119,187
DISTANCE MEASURING DEVICES
Hans Meyer, Le Bugnon 24, Renens, Vaud, Switzerland
Filed Aug. 20, 1962, Ser. No. 217,814
Claims priority, application Switzerland Aug. 31, 1961
7 Claims. (Cl. 33—147)

This invention relates to distance measuring devices.

According to the present invention there is provided a distance measuring device comprising a casing, movable feeler means extending through and projecting from said casing, a support pivotally mounted in said casing and spaced from said feeler means, graduated measurement indicating means mounted in said support for pivotal movement therewith, transmission lever means mounted in said casing and operatively engaging said feeler means and said indicating means for transmitting motion of said feeler means to said indicating means, and means for varying the angular position of said support relatively to said casing for zero adjustment of said graduated measurement indicating means.

With this possibility the graduated scale of the indicating means can be adapted to a particular range of measurements. A further advantage of the device resides in that, when the measurement indicating means is thus mounted in the casing, displacement from outside, for example by rotating the graduated ring, is not possible.

Further proposed arrangements are concerned with the mounting of the translatable and swivelled indicating means in lever means oscillatably mounted in the casing.

If the device according to the invention is an internal measurement device, e.g. a device for measuring the inner diameter of bores, its feeler means may be mounted in an interchangeable head. The latter is advantageously made of non-metallic synthetic material, which head can be manufactured accurately and cheaply by known methods.

For a better understanding of the invention and to show how the same may be carried into effect, reference will now be made to the accompanying diagrammatic drawings in which:

FIGURE 1 is an axial section through a first constructional form of device according to the invention;

FIGURE 2 is a plan view of part of the FIGURE 1 device;

FIGURE 3 is a cross-section taken along the line a—a of FIGURE 1;

FIGURE 4 is an axial section through a second constructional form of the device according to the invention;

FIGURE 5 is a cross-section taken along the line b—b of FIGURE 4; and

FIGURE 6 is a cross-section taken along the line c—c of FIGURE 4.

The internal measurement device illustrated in FIGURE 1 comprises a casing 1 in which a movable feeler 2 acts via a lever 3 on a lever operated indicator 4. The end portion 1a of the casing forms a measuring head in which are mounted, to one side, a fixed measuring point 5 and, on the opposite side, the movable feeler 2. The latter, which extends through and projects from the casing, is held in place by a grub screw 6 and acts upon the arm 3a of the transmission lever 3. The lever 3 is mounted on a pin 7 supported in the casing 1 and its swivel movement is limited by an abutment screw 8 against which it is pressed by a spring 9.

The lever operated indicator 4 is mounted by means of its tubular arm 4a in a bore of support 10, in which bore the indicator 4 may be moved axially of the casing 1 and can be secured in a selected position by means of a grub screw 11. The support 10 is in turn oscillatably mounted in the casing 1 by means of two pins 12 screwed in the casing wall (see FIGURE 3). The support 10 is acted upon by a spring 13, against a wedge forming set screw 14, the latter serving to swivel the support 10 together with the indicator 4 around pins 12 thereby to adjust its scalar indications.

In the second internal measurement device shown in FIGURES 4 to 6, the measuring head 20 can be separated from the housing 21 and can be engaged thereon and secured by means of a threaded ring 22 abutting against a spring annulus 23.

The two feeler arms 24 are slidably mounted in the head 20 and are held in place by screws 25.

These two feelers act on a transmission system comprising an indicator actuating lever 26 and an indicator carrying lever or member 27 swivel mounted in casing 21 by means of a spring blade 28 which is fixed at one end to the carrier member 27 by a screw 29 and at the other end to the casing 21 by a screw 30. The carrier member 27 carries at its end facing the measuring head 20 a pin 31 on which is mounted the lever 26 (see FIGURE 5). Between the lever 26 and the carrier member 27 is provided a spring 32 which presses the measuring contacts 26a and 27a against the feeler arms 24.

Into the opposite end of the carrier member 27 are screwed two pivot pins 33 on which a support 36 is swivel mounted. The latter may be swivelled by means of a wedge forming screw 34 against the action of a spring 35.

An indicator 37 is so mounted in the bore 36a of support 36 that it may be axially moved in this bore and secured by a set screw 38. It is thus possible to shift axially the point at which the feeler 37a of the indicator acts on lever 26, so that the right hand arm of the lever 26 can be lengthened or shortened. The transmission ratio can accordingly easily be corrected.

The right hand end of the casing 21 is enclosed in a cap 39 having a window 40 for reading the graduated dial of the indicator. The whole of the mechanism is thus effectively protected from impurities. The set screw 38 and the adjustment screw 34 can be reached after removing closure screws 41 and 42 from access holes formed in the cap 39.

The invention is not only applicable to internal measurement apparatus but can also, for example, be applied to external measurement apparatus by appropriate adaptation of the lever means.

I claim:

1. A distance measuring device comprising a casing, movable feeler means extending through and projecting from said casing, a support pivotally mounted in said casing and spaced from said feeler means, graduated measurement indicating means mounted in said support for pivotal movement therewith, transmission lever means mounted in said casing and operatively engaging said feeler means and said indicating means for transmitting motion of said feeler means to said indicating means, and means for varying the angular position of said support relatively to said casing for zero adjustment of said graduated measurement indicating means.

2. A device as claimed in claim 1, wherein said angular positioning means includes spring means between said support and said casing to one side of the pivotal axis of said support, and adjustable wedge means between said support and said casing on the opposite side of said pivotal axis.

3. A distance measuring device comprising a casing; a pair of movable feelers extending through and projecting from said casing; a pivotal support in said casing and spaced from said feelers; graduated measurement indicating means mounted in said support for pivotal movement therewith; transmission lever means mounted in said casing for transmitting motion of said feelers to said indicating means, said lever means including a first lever having one end portion operatively engaging one of said feelers and the opposite end portion pivotally carrying said support, a second lever having one end portion operatively engaging the other of said feelers and the opposite end portion engaging said indicating means, and pivot means pivotally connecting said two levers to one another intermediate their end portions; means for varying the angular position of said support relatively to said casing for zero adjustment of said graduated measurement indicating means; and flexible connection means between said first lever and said casing whereby said lever means, said indicating means, said support and said angular positioning means constitute a floating assembly within said casing.

4. A device as claimed in claim 3, wherein said angular positioning means includes spring means between said support and said first lever to one side of the pivotal axis of said support, and adjustable wedge means between said support and said first lever on the opposite side of said pivotal axis.

5. A device as claimed in claim 3, wherein said casing includes a removable cap in which are mounted said feeler means.

6. A device as claimed in claim 3, wherein said casing includes a removable cap made of synthetic non-metallic material and in which are mounted said feeler means.

7. A distance measuring device comprising a casing, movable feeler means extending through and projecting from said casing, a support pivotally mounted in said casing and spaced from said feeler means, graduated measurement indicating means mounted in said support for pivotal movement therewith, transmission lever means mounted in said casing and operatively engaging said feeler means and said indicating means for transmitting motion of said feeler means to said indicating means, adjustment means for enabling movement of said indicating means relatively to said support towards and away from said feeler means to modify the transmission ratio of the lever means, and means for varying the angular position of said support relatively to said casing for zero adjustment of said graduated measurement indicating means.

No references cited.